US012463311B2

(12) United States Patent
Kim et al.

(10) Patent No.: US 12,463,311 B2
(45) Date of Patent: Nov. 4, 2025

(54) RF FILTER ASSEMBLY FOR ANTENNA

(71) Applicant: KMW INC., Hwaseong-si (KR)

(72) Inventors: Joung Hoe Kim, Hwaseong-si (KR); Sang Yoong Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 288 days.

(21) Appl. No.: 18/114,228

(22) Filed: Feb. 25, 2023

(65) Prior Publication Data

US 2023/0223670 A1 Jul. 13, 2023

Related U.S. Application Data

(63) Continuation of application No. PCT/KR2021/011338, filed on Aug. 25, 2021.

(30) Foreign Application Priority Data

Aug. 28, 2020 (KR) ........................ 10-2020-0109563
Aug. 24, 2021 (KR) ........................ 10-2021-0111453

(51) Int. Cl.
*H01P 1/20* (2006.01)
*H01P 1/203* (2006.01)
*H01P 1/208* (2006.01)

(52) U.S. Cl.
CPC ................ *H01P 1/203* (2013.01); *H01P 1/20* (2013.01); *H01P 1/208* (2013.01)

(58) Field of Classification Search
CPC ........ H01P 1/203; H01P 1/20309; H01P 1/20; H01P 1/208; H01P 1/2002; H01P 1/201; H01P 1/202; H01P 1/207
See application file for complete search history.

(56) References Cited

U.S. PATENT DOCUMENTS

2018/0226946 A1 8/2018 Kim et al.
2023/0121638 A1* 4/2023 Kim ...................... H01P 11/007 343/893
2023/0238675 A1* 7/2023 Kim .......................... H01P 3/12 333/208

FOREIGN PATENT DOCUMENTS

KR 10-1010401 A 1/2011
KR 10-2018-0055770 A 5/2018
(Continued)

OTHER PUBLICATIONS

International Search Report mailed Nov. 19, 2021 for International Application No. PCT/KR2021/011338 and its English translation.
(Continued)

*Primary Examiner* — Stephen E. Jones
(74) *Attorney, Agent, or Firm* — Insight Law Group, PLLC; Seung Lee

(57) ABSTRACT

The present invention relates to an RF filter assembly for an antenna and, particularly, comprises: a plurality of band pass filters (BPFs); a filter board which is arranged to be stacked on the front surface of a main board and which mediate the coupling of the band pass filters for the front surface of the main board; low pass filters (LPFs) intaglio- or embossed-printed on front surface of the filter board; and an air layer formation pad arranged between the filter board and the band pass filters to form a predetermined air layer between the front surface of the filter board and rear surfaces of the band pass filters, and thus the overall performance of a filter product can be improved by minimizing insertion loss of a filter.

13 Claims, 10 Drawing Sheets

(56) References Cited

FOREIGN PATENT DOCUMENTS

| | | | |
|---|---|---|---|
| KR | 10-2019-0060597 | A | 6/2019 |
| KR | 10-2127506 | A | 6/2020 |
| KR | 10-2127506 | B1 | 6/2020 |

OTHER PUBLICATIONS

Non-final Office Action mailed Apr. 7, 2023 from the Korean Intellectual Property Office for Korean Application No. 10-2021-0111453.

* cited by examiner (a)

(b)

RF FILTER ASSEMBLY FOR ANTENNA

CROSS-REFERENCE TO RELATED APPLICATIONS

This application is a continuation application of International Application No. PCT/KR2021/011338, filed Aug. 25, 2021, which claims the benefit of Korean Patent Application Nos. 10-2020-0109563, filed Aug. 28, 2020; and 10-2021-0111453, filed Aug. 24, 2021, in the Korean Intellectual Property Office, the disclosures of which are incorporated herein in their entirety by reference.

TECHNICAL FIELD

The present disclosure relates to a radio frequency filter assembly for an antenna, and more particularly, to an RF filter assembly for an antenna, which reduces an insertion loss and is easily installed and assembled.

BACKGROUND ART

In order to satisfy wireless data traffic demands that tend to increase after 4G ($4^{th}$ generation) communication system commercialization, efforts to develop an enhanced 5G ($5^{th}$ generation) communication system or a pre-5G communication system are being made. For this reason, the 5G communication system or the pre-5G communication system is called a beyond 4G network communication system or a post long term evolution (LTE) system.

In order to achieve a high data transfer rate, in the 5G communication system, an implementation in a mmWave band (e.g., such as a 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), array antenna, analog beamforming, and large scale antenna technologies have been discussed in the 5G communication system.

In particular, the array antenna technology is an element array technology in which multiple filters, that is, one of the antenna elements, and an antenna device need to be intensively mounted on the entire surface of a main board having one board form and which physically requires a high degree of accuracy for an impedance matching design between multiple reception channels and transmission channels. Recently, in the 5G communication system market, a demand for a ceramic waveguide filter which facilitates a frequency filtering design and can be easily fabricated, among the array antennas, tends to increase. A mass production technology for supply in accordance with a demand for the ceramic waveguide filter is required.

FIG. 1 is a concept view illustrating the state in which an RF filter assembly for an antenna according to a conventional technology has been stacked.

As illustrated in FIG. 1, in an example 1 of the RF filter assembly for an antenna according to the conventional technology, multiple ceramic waveguide filters (CWFs) 20, that is, a kind of bandpass filter (BPF) among RF filters, are mounted and arranged on a front surface of a main board 10 through the medium of a PCB for fixing 5. A microstrip line filter 30, that is, a kind of low pass filter (LPF), is integrally stacked and formed within the PCB for fixing 5.

However, the example 1 of the RF filter assembly for an antenna constructed above according to a conventional technology has a problem in that an insertion loss of the LPF excessively occurs because the microstrip line filter 30 is disposed within the PCB for fixing 5 made of a dielectric material (or a ceramic material).

That is, the insertion loss of the microstrip line filter 30 greatly occurs because both sides corresponding to the main board 10 and the ceramic waveguide filter 20 on the basis of the microstrip line filter 30 are constructed to be covered by the dielectric material.

DISCLOSURE

Technical Problem

The present disclosure has been made to solve the problems, and an object of the present disclosure is to provide an RF filter assembly for an antenna, which has a minimized insertion loss.

Moreover, another object of the present disclosure is to provide an RF filter assembly for an antenna, which has improved assembly and productivity.

Objects of the present disclosure are not limited to the aforementioned objects, and other objects not described above may be evidently understood by those skilled in the art from the following description.

Technical Solution

An RF filter assembly for an antenna according to an embodiment of the present disclosure includes multiple bandpass filters (BPFs), a filter board stacked and disposed on a front surface of a main board and configured to mediate a coupling of the BPFs with the front surface of the main board, a low pass filter (LPF) in which a capacitor line serving as capacitance and an inductor line serving as an inductor are printed on a front surface of the filter board in an intaglio or embossed form, and an air layer-forming pad disposed between the filter board and the BPF and configured to form a predetermined air layer between the front surface of the filter board and a rear surface of the BPF.

In this case, the BPF may include a ceramic waveguide filter made of a ceramic material.

Furthermore, the filter board may include any one of a dielectric material and an FR4 material.

Furthermore, the air layer-forming pad may be made of a metal material or a dielectric.

Furthermore, the LPF may include a microstrip line filter provided as a conductive material and integrally formed on the front surface of the filter board in a way to be exposed to the front surface.

Furthermore, the microstrip line filter may be printed and formed on the front surface of the filter board in a predetermined pattern shape from an input point of a power feed signal to an output point thereof. An LPF circuit-receiving part for receiving the predetermined pattern shape of the microstrip line filter may be incised and formed in the air layer-forming pad.

Furthermore, input and output ports for inputting and outputting power feed signals may be connected to the rear surface of the BPF in a way to be separated from each other. BPF port-receiving parts for receiving locations corresponding to the input and output ports of the BPF, respectively, may be incised and formed in the air layer-forming pad.

Furthermore, the air layer-forming pad may include an separation part body configured to separate the BPF from the front surface of the filter board at a predetermined distance, and input and output port support parts provided within the separation part body in a way to be separated from the separation part body and configured to separate, from the filter board, each of portions corresponding to the input and output ports that are provided to be responsible for an input and output of power feed signals to and from the BPF.

Furthermore, the separation part body and the input and output port support parts may separate the multiple BPFs from each other at an identical height.

Furthermore, the separation part body may include a support plate part surface-brought into contact with the rear surface of the BPF, and an edge support stage bent from an end of an edge of the support plate part toward the front surface of the filter board.

Furthermore, the edge support stage may be formed in a shape in which a concave part and a convex part are repeated along the end of the edge.

Furthermore, a one-side capacitor line serving as the capacitance, the other-side capacitor line arranged in parallel to the one-side capacitor line in a way to be separated from the one-side capacitor line, and an inductor line connecting the one-side capacitor line and the other-side capacitor line may be repeatedly formed in a certain section in the microstrip line filter. A part of or the entire inductor line may be separated from the front surface of the filter board.

Furthermore, a separation incision part having a hole or groove form and separating the part of or the entire inductor line may be formed in the filter board.

Advantageous Effects

In accordance with the RF filter assembly for an antenna according to an embodiment the present disclosure, there is an effect in that performance of the filter is improved because an insertion loss of the microstrip line filter can be minimized.

Furthermore, in accordance with the RF filter assembly for an antenna according to an embodiment of the present disclosure, there is an effect in that assembly and productivity are improved.

Figure 1:
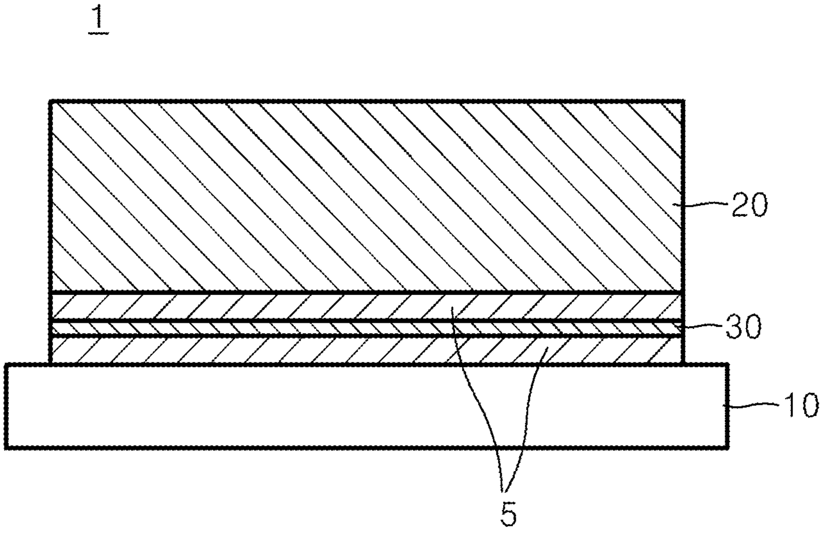
FIG. 1 (Prior Art)
FIG. 1 is a concept view illustrating the state in which an RF filter assembly for an antenna according to a conventional technology has been stacked.

100: RF filter assembly for antenna 105: filter board
110: main board 120: ceramic waveguide filter
121: filter body 122: resonator post
123: cover for tuning 124: engraving pad
125: filter cover 130: microstrip line filter
131*a*: input port location 131*b*: output port location
133: pattern-forming part 135*a*: one-side capacitor line
135*b*: other-side capacitor line 135*c*: inductor line
137: solder groove 140: air layer-forming pad
141, 142: separation part body 141: support plate part
142: edge support stage 143: input and output port support parts
145: BPF port-receiving parts 149: LPF circuit-receiving part
150: signal line incision part S: spurious

BEST MODE

Hereinafter, an RF filter assembly for an antenna according to an embodiment of the present disclosure is described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that the detailed description of the related well-known configuration or function may obscure the gist of the present disclosure, the detailed description thereof will be omitted.

In describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as having an ideal meaning or an excessively formal meaning unless explicitly defined otherwise in the specification.

Figure 2A:
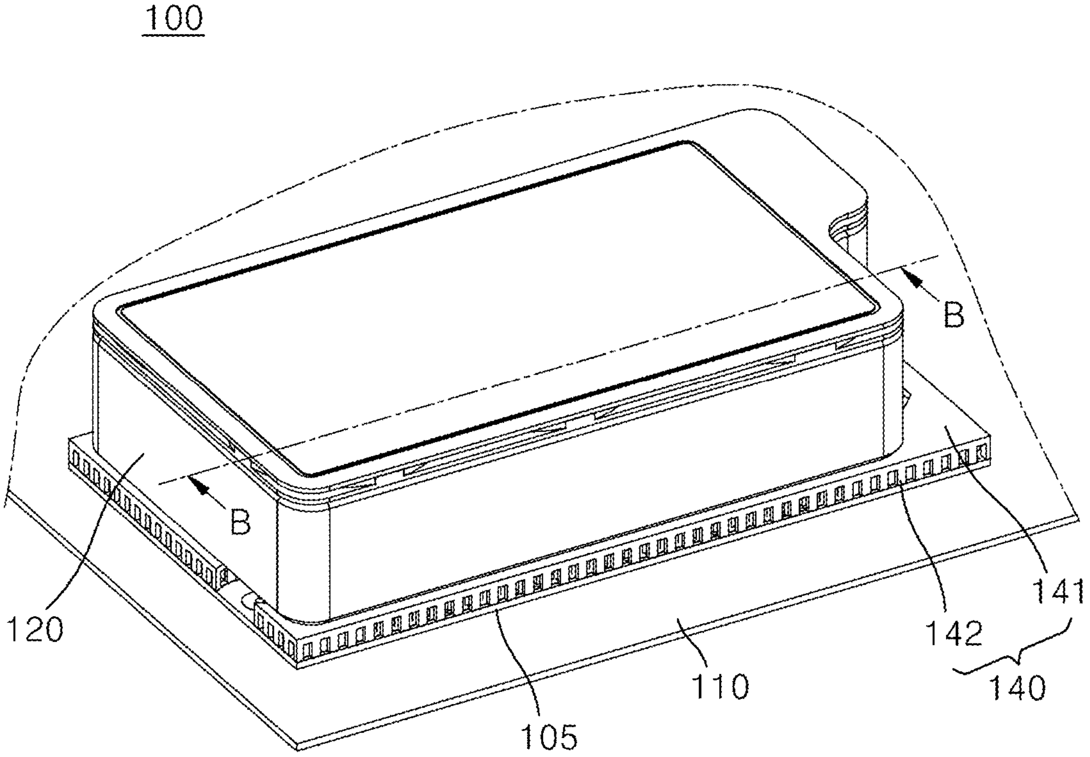
FIGS. 2A and 2B are perspective views illustrating an RF filter assembly for an antenna according to an embodiment of the present disclosure.
Figure 2B:
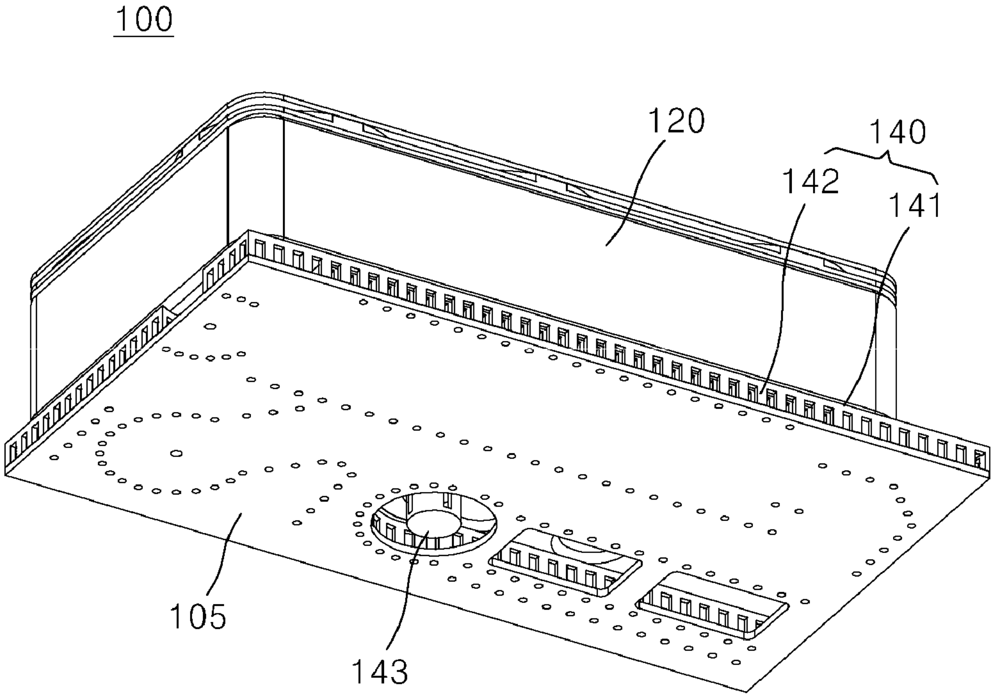
Figure 3:
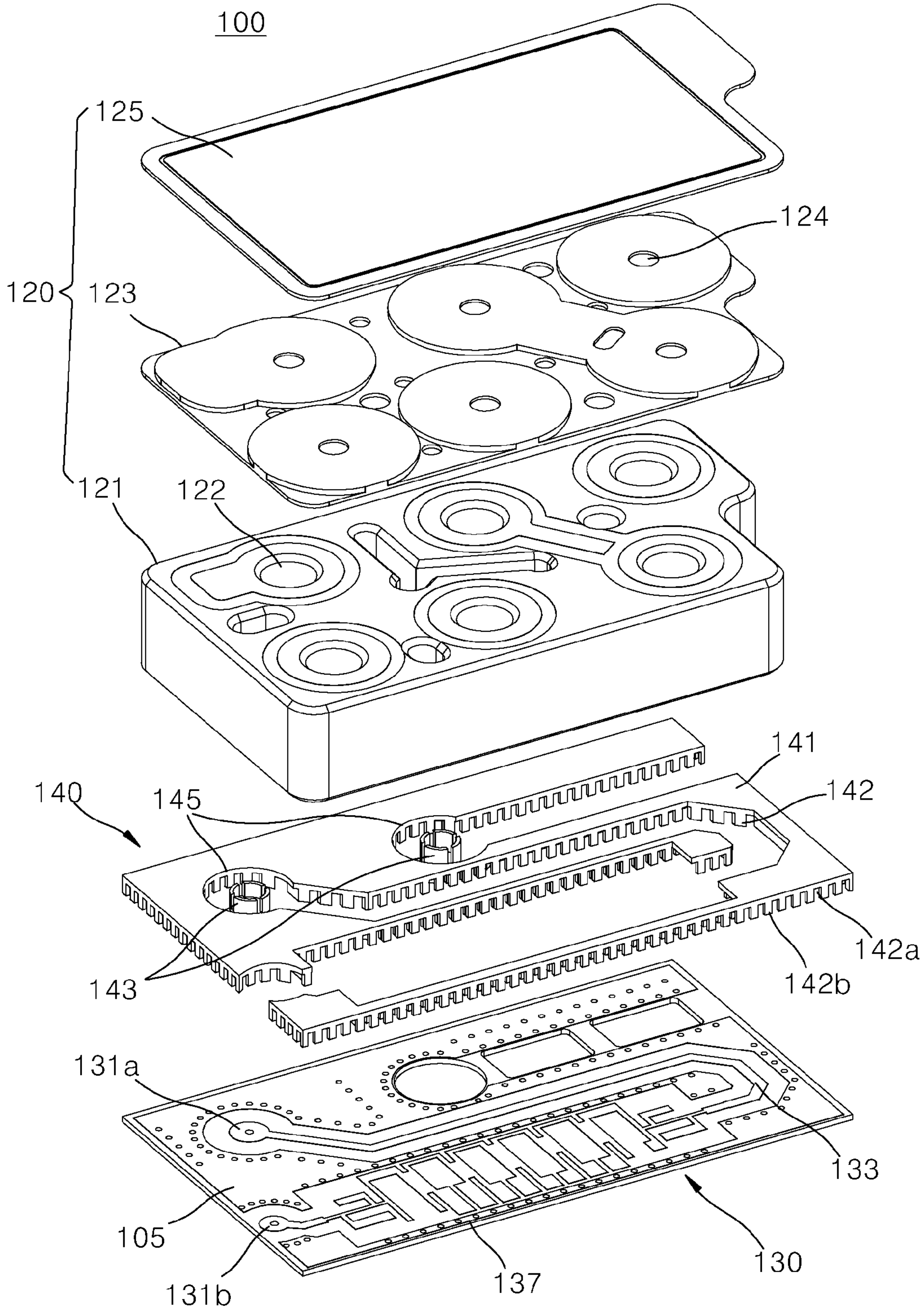
FIG. 3 is an exploded perspective view of FIG. 2A.
Figure 4:
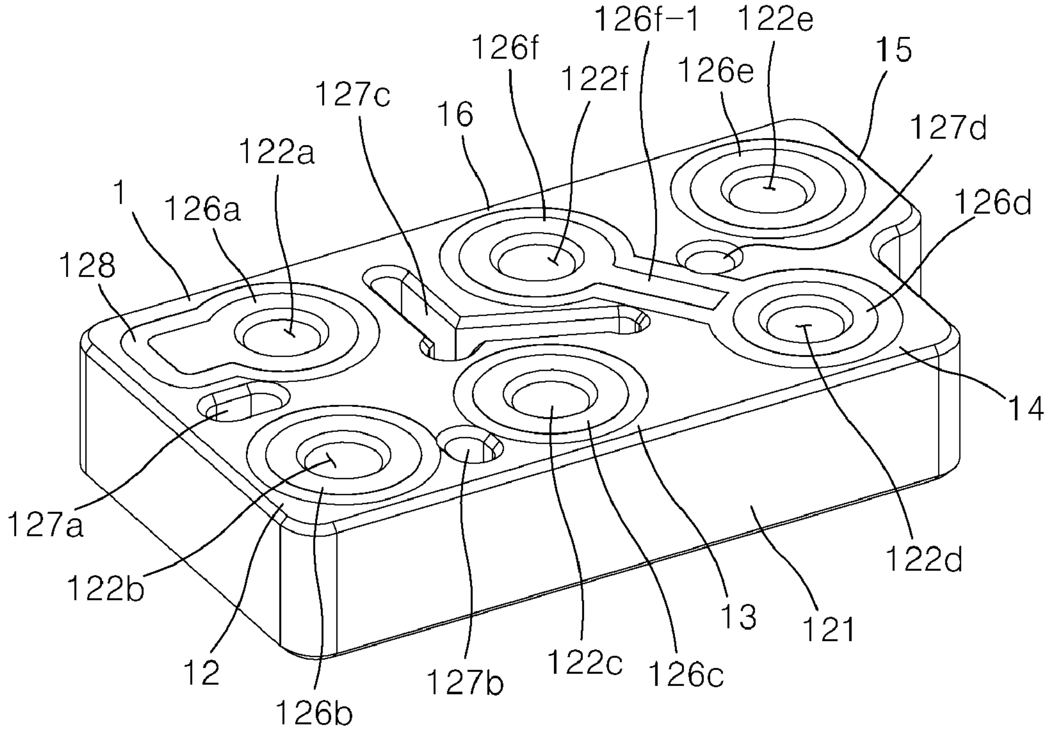
FIG. 4 is a perspective view illustrating an RF filter, among components of FIG. 3.

FIGS. 2A and 2B are perspective views illustrating an RF filter assembly for an antenna according to an embodiment of the present disclosure. FIG. 3 is an exploded perspective view of FIG. 2A. FIG. 4 is a perspective view illustrating an RF filter, among components of FIG. 3.

An RF filter assembly 100 for an antenna according to an embodiment of the present disclosure includes a main board 110, RF filters 120 and 130, and an air layer-forming pad 140, as referenced in FIGS. 2A to 4.

The main board 110 is a printed circuit board (PCB) having one board form. The multiple RF filters 120 and 130 or some of electronic parts (not illustrated) for being attuned with the multiple RF filters may be mounted on one surface of the main board. Multiple electronic parts (not illustrated) that are provided as multiple power feed-related parts capable of calibration power feed control toward the multiple RF filters 120 and 130 may be mounted on the other surface of the main board.

In an embodiment of the present disclosure, a single air layer-forming pad 140 has been illustrated and described as being provided on one surface (a top in FIG. 2A) of the main board 110 provided as the PCB having one board form, for convenience of understanding. However, the air layer-forming pad 140 is formed at a location at which some or all of the multiple RF filters 120 and 130 are disposed in a unique form, but does not exclude a case in which the air layer-forming pad is formed in a shape in which the air layer-forming pads are stacked and disposed at multiple places on the entire one surface of the main board 110.

In this case, the RF filters 120 and 130 may include multiple bandpass filters (BPFs) 120 and a low pass filter (LPF) 130.

The BPF 120 may be provided as a ceramic waveguide filter (CWF) formed of a ceramic material. The LPF 130 may be provided as a microstrip line filter.

Each of the multiple ceramic waveguide filters (hereinafter indicated as reference numeral "120") provided as a kind of bandpass filter includes a filter body 121 made of a ceramic material and at least four resonant blocks provided in the filter body 121, as referenced in FIG. 3. A corresponding resonator post 122 has been installed in each resonant block. Each resonator post 122 may filter a frequency signal through adjacent coupling with an adjacent resonator post 122 or cross coupling in which the resonator posts are coupled by skipping at least one resonator post.

In this case, the resonant blocks 11 to 16 formed in the filter body 121 do not need to be physically fully separated from each other, and are only required to be divided by a change in the transmission path width of a signal by barrier ribs that are provided in the filter body 121.

For example, as referenced in FIG. 4, six resonator posts 122*a* to 122*f* are provided in the filter body 121. When an electrical signal is input through an input port hole that is described later and that has not been illustrated, the electrical signal is applied through the first resonator post 122*a* that is the closest to the input port hole. After frequency filtering is sequentially performed on the electrical signal via the second resonator post 122*b*—the third resonator post 122*c*—the fourth resonator post 122*d*—the fifth resonator post 122*e*—the sixth resonator post 122*f*, the electrical signal is output through an output port hole that is described later and that has not been illustrated.

In this case, a first barrier rib 127*a* is provided between the first resonator post 122*a* and the second resonator post 122*b*, and divides the first resonant block 11 and the second resonant block 12. A second barrier rib 127*b* is provided between the second resonator post 122*b* and the third resonator post 122*c*, and divides the second resonant block 12 and the third resonant block 13. A part of a third barrier rib 127*c* is provided between the third resonator post 122*c* and the fourth resonator post 122*d*, and divides the third resonant block 13 and the fourth resonant block 14. A fourth barrier rib 127*d* is provided between the fourth resonator post 122*d* and the fifth resonator post 122*e*, and divides the fourth resonant block 14 and the fifth resonant block 15. The remaining part of the third barrier rib 127*c* is provided between the fifth resonator post 122*e* and the sixth resonator post 122*f*, and divides the fifth resonant block 15 and the sixth resonant block 16. In particular, the third barrier rib 127*c* is provided between the first resonator post 122*a*, the third resonator post 122*c*, and the sixth resonator post 122*f*, and may perform a role to physically divide three resonant blocks (the first resonant block 11, the third resonant block 13, and the sixth resonant block 16) simultaneously.

Each of the first barrier rib 127*a* to the fourth barrier rib 127*d* may be formed to have a predetermined size that vertically penetrates the filter body 121.

An outer cover of the filter body 121 may be plated with a film of a metallic material. A flow of an electrical signal into the inside and outside of the filter body except the input and output ports described later may be blocked.

It is preferred that the resonant blocks provided in the filter body 121 are at least four resonant blocks as described above in order to perform filtering by the adjacent coupling or cross coupling of an electrical signal that flows through an input port or an output port not illustrated. In an embodiment of the present disclosure, an example in which the filter body 121 includes the six resonant blocks is described.

That is, in the RF filter assembly 100 for an antenna according to an embodiment of the present disclosure, the ceramic waveguide filter 120 has the six resonant blocks 11 to 16 provided in one filter body 121. Each of the resonator posts 122*a* to 122*f* of the respective resonant blocks 11 to 16 may be installed in a form in which a dielectric material having a predetermined dielectric constant is filled and fixed. In this case, since the air is also one of dielectric materials, a separate filling and fixing process is not required if the air is adopted and filled as the dielectric material that constitutes the resonator posts 122*a* to 122*f*. Accordingly, each of the six resonator posts 122*a* to 122*f* may be formed in an empty space form in which a part of the dielectric material has been removed from the filter body 121.

In this case, as referenced in FIG. 4, film parts 126*a* to 126*f* of a conductive material may be plated and formed on internal surfaces of the resonator posts 122*a* to 122*f* and parts of one surface of the filter body 121, which correspond to edge portions of the resonator posts 122*a* to 122*f* at the top thereof. Some of the film parts 126*a* to 126*f* may further include a film extension stage 126*f*-1 that has been further extended and formed toward a related resonator post 126*d* so that cross coupling can be easily implemented between some resonator posts among the resonator posts 122*a* to 122*f*.

In an embodiment of the present disclosure, the film extension stage 126*f*-1 is provided between the fourth resonator post 122*d* and the sixth resonator post 122*f* by skipping the one fifth resonator post 122*e* so that cross coupling can be implemented therebetween. The film extension stage 126*f*-1 may be extended from the film part 126*f* formed in the sixth resonator post 122*f* toward the film part 126*d* of the fourth resonator post 122*d* on the one surface of the filter body 121 so that the cross coupling can be more easily implemented.

Moreover, referring to FIG. 4, a ground part 128 in which any film plating layer is not formed may be provided around each of the film parts 126*a* to 126*f*. The ground part 128 may serve as the ground that insulates a portion that has been plated on an external surface of the filter body 121 in a film form and each of the film parts 126*a* to 126*f* of the resonator posts 122*a* to 122*f*.

Meanwhile, although not illustrated, the input port hole for the connection of the input port (not illustrated) that inputs an electrical signal to any one of the six resonator posts 122 and the output port hole for the connection of the output port (not illustrated) that outputs an electrical signal from any one of the six resonator posts 122 may be formed on the other surface of the ceramic waveguide filter 120. The input port and the output port that have been connected to the main board 110 through the medium of input and output port support parts 143, among components of the air layer-forming pad 140 described later, may be installed in the input port hole and the output port hole.

Moreover, as referenced in FIG. 3, the ceramic waveguide filter 120 may further include a cover for tuning 123 installed on an opened one side of each of the resonator posts 122 and provided to perform frequency tuning through an engraving method, a tuning screw, etc. and a filter cover 125 coupled to the one surface of the filter body 121 including the covers for tuning 123 so that the filter cover 125 covers the one surface.

If the frequency tuning method is the engraving method, an engraving pad 124 may be integrally formed in the cover for tuning 123. The engraving pads 124 may be separated from one another and disposed at locations corresponding to the resonator posts 122, and are engraved by using an engraving tool not illustrated. Accordingly, frequency tuning can be performed by finely adjusting a separation distance between the engraving pad and the bottom of the resonator post 122.

Meanwhile, as referenced in FIG. 3, the microstrip line filter provided as a kind of LPF 130 may be injected and molded in a shape in which the microstrip line filter is printed on a front surface of a filter board 105 or injected and molded so that a front surface of the microstrip line filter is exposed toward the BPF 120 that is stacked in front of the microstrip line filter.

In this case, the filter board 105 may include any one of a dielectric material and an FR4 material. If the filter board 105 is made of the dielectric material, the structure of the filter board 105 may be changed and designed as described later in order to minimize an insertion loss of the microstrip line filter that is printed and formed as the LPF 130 on the front surface of the filter board 105, and detailed contents thereof are more specifically described later.

If the filtering of a specific frequency band is fully performed by using the BPF 120, a separate LPF 130 does not need to be provided. In an embodiment of the present disclosure, however, the BPF 120 is adopted as the ceramic waveguide filter 120. A spurious phenomenon can be removed by adding the LPF 130 because the spurious phenomenon may occur on one of both ends of a pass band in view of characteristics of a ceramic material.

In this case, the LPF 130 adopted as the microstrip line filter has a shape in which the front surface portion of a PCB for fixing, which is made of the dielectric material (or the ceramic material), has been removed compared to the conventional technology referenced in FIG. 1. Accordingly, the occurrence of the insertion loss attributable to a contact with the dielectric material (or the ceramic material) was minimized.

However, the ceramic waveguide filter 120, that is, a kind of BPF 120 that is stacked and disposed on the front surface of the microstrip line filter provided as the LPF 130, is also made of the ceramic material. Accordingly, the RF filter assembly 100 for an antenna according to an embodiment of the present disclosure may further include the air layer-forming pad 140 in order to minimize the influence of the insertion loss of the microstrip line filter, that is, the LPF 130, attributable to the ceramic material of the BPF 120.

As referenced in FIGS. 2A to 4, the air layer-forming pad 140 is disposed between the filter board 105 and the multiple ceramic waveguide filters 120, and plays a role to separate each of the ceramic waveguide filter 120 from the front surface of the filter board 105.

Such an air layer-forming pad 140 may be generally made of a metal material or a dielectric. In this case, the metal material may include any one of steel, stainless steel (SUS), and Cu materials.

Figure 5:
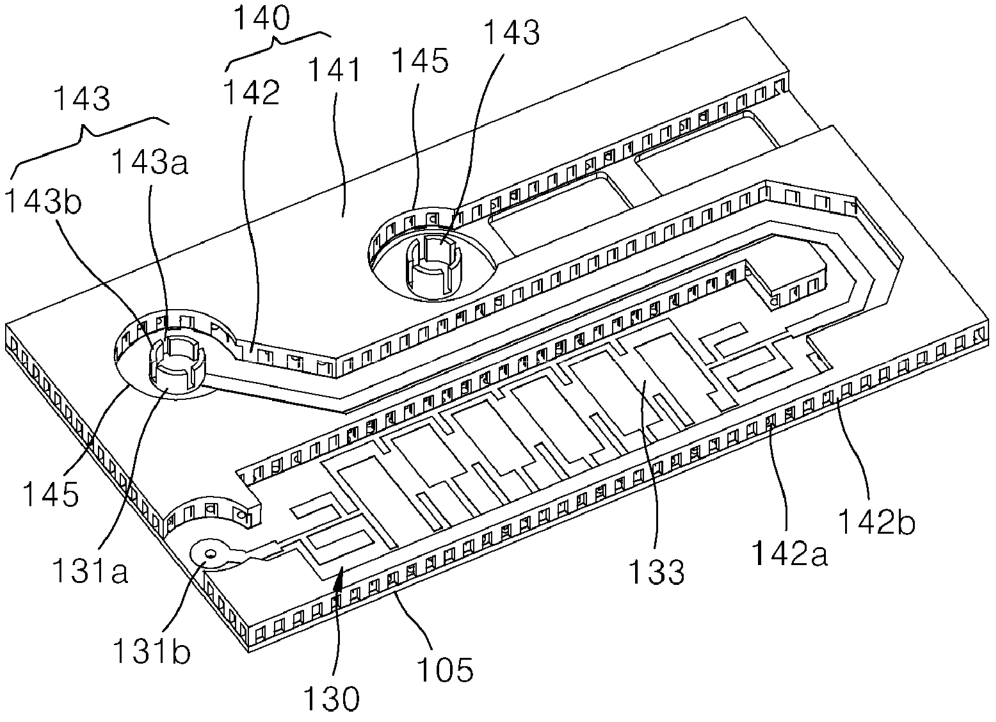
FIG. 5 is a perspective view illustrating the state in which an air layer-forming pad has been coupled to one surface of a filter board including a microstrip line filter, among the components of FIG. 2A.
Figure 6:
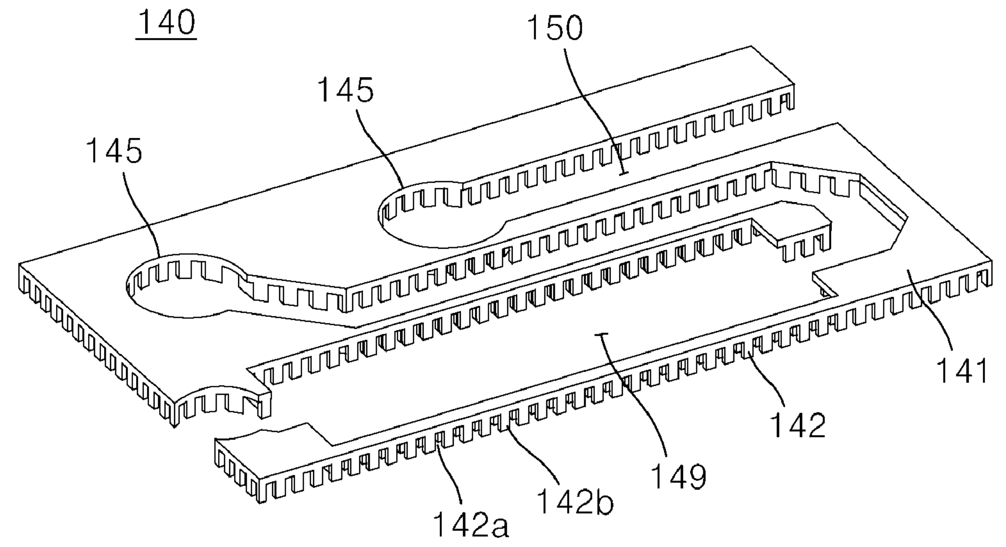
FIG. 6 is a perspective view illustrating the air layer-forming pad, among the components of FIG. 2A.
Figure 7:
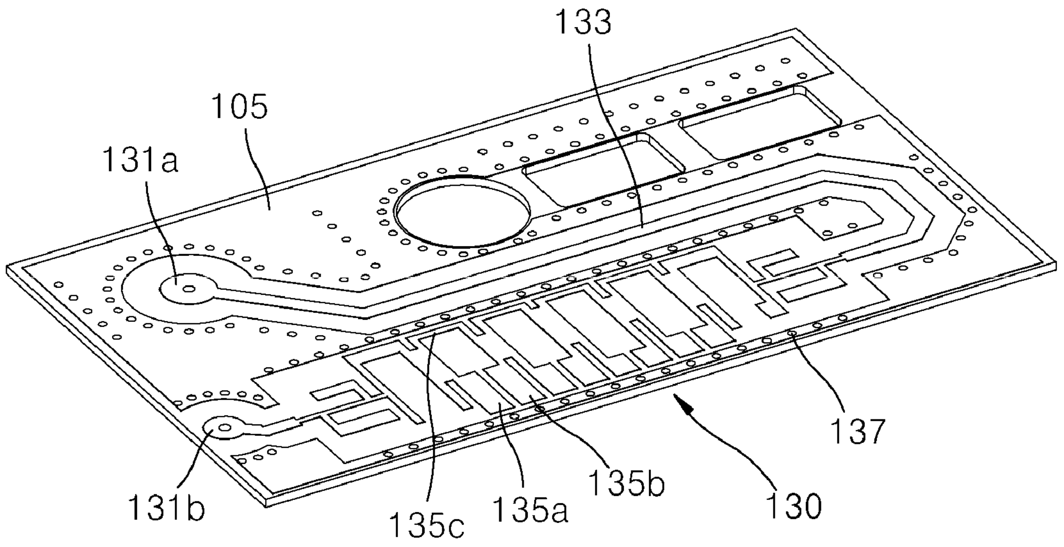
FIG. 7 is a perspective view illustrating the filter board including the microstrip line filter, among the components of FIG. 2A.
Figure 8:
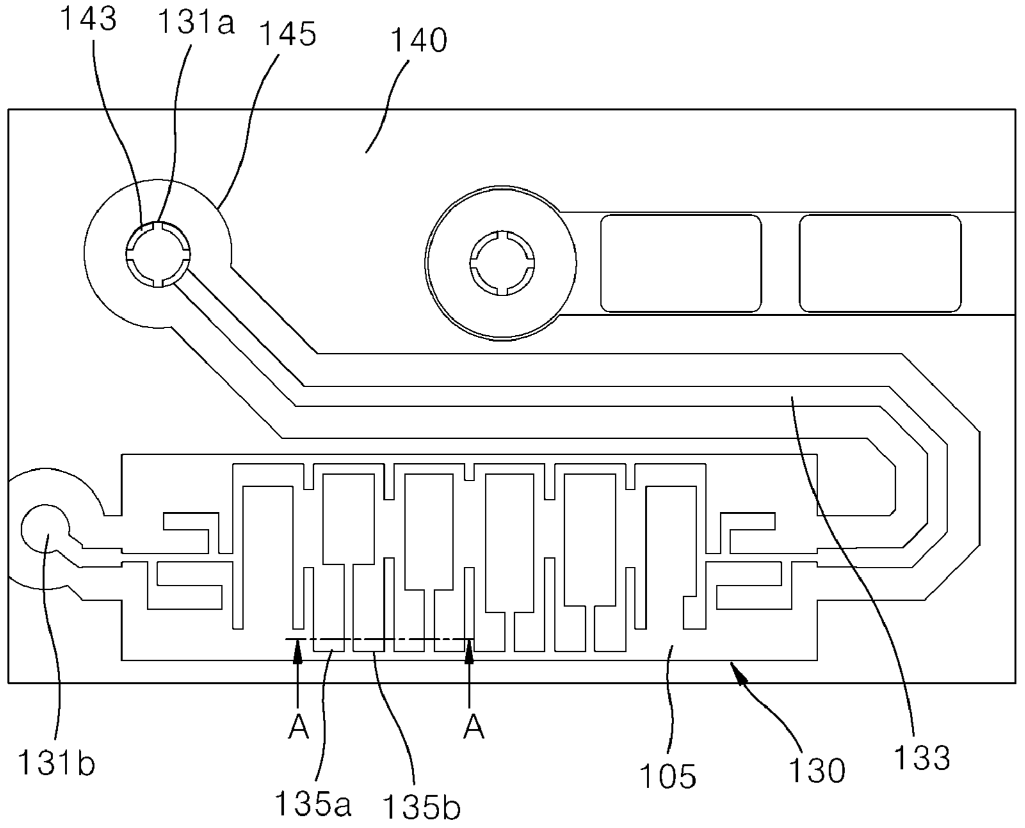
FIG. 8 is a plan view illustrating the filter board including the microstrip line filter, among the components of FIG. 2A.
Figure 9:
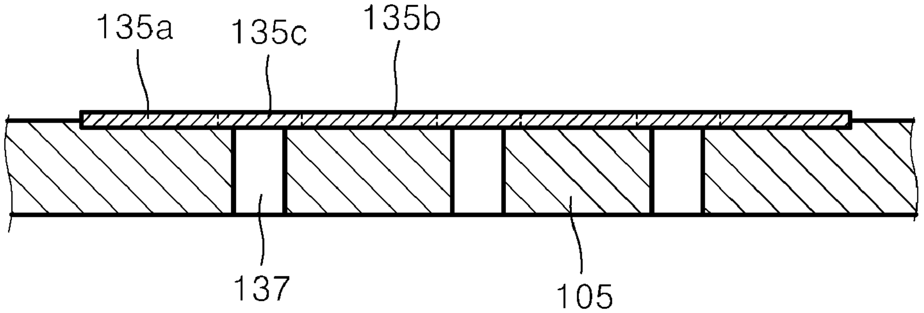
FIG. 9 is a cross-sectional view taken along line A-A in FIG. 8, and is a cross-sectional view illustrating the filter board according to various embodiments.
Figure 9:
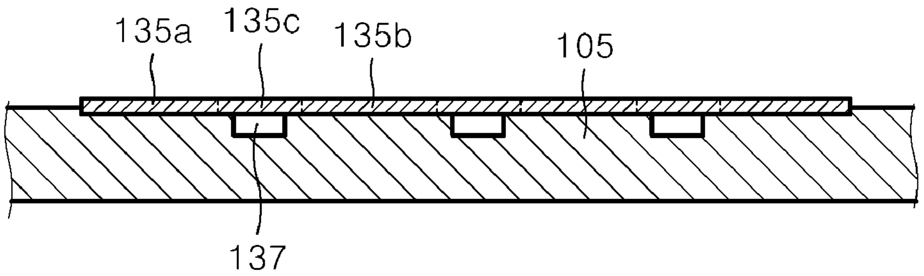

FIG. 5 is a perspective view illustrating the state in which the air layer-forming pad has been coupled to one surface of the filter board including the microstrip line filter, among the components of FIG. 2A. FIG. 6 is a perspective view illustrating the air layer-forming pad, among the components of FIG. 2A. FIG. 7 is a perspective view illustrating the filter board including the microstrip line filter, among the components of FIG. 2A. FIG. 8 is a plan view illustrating the filter board including the microstrip line filter, among the components of FIG. 2A. FIG. 9 is a cross-sectional view taken along line A-A in FIG. 8.

Referring to FIGS. 3 and 5, the air layer-forming pad 140 may include separation part bodies 141 and 142 that are formed in a shape corresponding to an outward appearance of the filter board 105 and that separate the BPF 120 from the front surface of the filter board 105 at a predetermined distance, and the input and output port support parts 143 that are provided in the same surface direction as the separation part bodies 141 and 142 within the separation part bodies 141 and 142 in a way to be separated from each other and that separate, from the filter board 105, portions corresponding to the input and output ports provided to be responsible for the input and output of power feed signals to and from the multiple ceramic waveguide filters 120, respectively. In this case, the input and output port support parts 143 may be provided as a pair so that the pair of input and output port support parts corresponds to the input port hole and the output port hole that have been formed in the ceramic waveguide filter 120.

The separation part bodies 141 and 142 and the input and output port support parts 143 may separate each of the multiple ceramic waveguide filters 120 from the front surface of the filter board 105 at the same height. This is more specifically described later.

As referenced in FIG. 6, the separation part bodies 141 and 142 may include a support plate part 141 that is surface-brought into contact with the rear surfaces of the multiple ceramic waveguide filters each provided as the BPF 120 and an edge support stage 142 that is bent from the end of an edge of the support plate part 141 toward the front surface of the filter board 105.

In this case, the edge support stage 142 is formed along the end of an outside edge of the support plate part 141, and may be bent from the end of the outside edge of the support plate part 141 to a rear surface of the support plate part 141 and extended and formed toward the front surface of the filter board 105 at a predetermined length.

The edge support stage 142 may be formed in a concave-convex part shape in which a concave part 142*a* and a convex part 142*b* are repeated along the end of the outside edge of the support plate part 141. This is for minimizing a solder coupling area for the filter board 105 by incised portions of the concave parts 142*a* of the edge support stage 142, also facilitating soldering coupling by making the edge support stage inserted into a solder hole that has been previously formed in the filter board 105 by protruded portions of the convex parts 142*b* of the edge support stage 142, and forming a predetermined air layer from the front surface of the filter board 105 to the rear surface of the ceramic waveguide filter 120.

As described above, by using the edge support stage 142 of the separation part bodies 141 and 142, the air layer can be formed by separating the ceramic waveguide filter 120 from the front surface of the filter board 105 at a predetermined distance, and the ceramic waveguide filter 120 can be uniformly supported against the front surface of the filter board 105.

Meanwhile, the input and output port support parts 143 may be formed in a shape in which a concave part and a convex part that are opened or protrude in a direction opposite to the edge support stage 142 of the separation part bodies 141 and 142 are repeated.

In this case, it is preferred that the ends of the edge support stage 142 of the separation part bodies 141 and 142 and the input and output port support parts 143 are formed at the same height from one surface of the support plate part 141. This is for making uniform the heights of the multiple ceramic waveguide filters 120 stacked on a front surface of the support plate part 141 by separating the support plate part 141 of the separation part bodies 141 and 142 from the filter board 105 at the same distance.

Multiple solder grooves 137 into which the convex parts **142*b* of the edge support stage 142 of the separation part bodies 141 and 142 are inserted or regularly positioned, respectively, may be formed in the filter board 105. Only the ends of the edge support stage 142 of the separation part bodies 141 and 142, which are inserted and fixed to the multiple solder grooves 137 may be coupled to the filter board 105** by a solder in the state in which solder cream has been applied.

In this case, the solder cream is a component for coupling the separation part bodies 141 and 142 to the front surface of the filter board 105 through a soldering coupling method. The solder cream is not applied on the entire area of the front surface of the filter board 105, but may be applied to only parts corresponding to the convex parts of the edge support stage 142, among the components of the separation part bodies 141 and 142, as described above. The reason for this is that a solder area can be relatively minimized compared to a case in which the solder cream is applied on the entire area of the filter board 105.

Meanwhile, as referenced in FIG. 3 to FIG. 6, BPF port-receiving parts 145 that are circularly incised and formed may be provided in the separation part bodies 141 and 142, respectively, in order to separate and install the pair of input and output port support parts 143 on the same surface.

In this case, as referenced in FIGS. 5 and 7, the microstrip line filter 130 that is provided as the LPF in the filter board 105 may be extended and formed so that the same location as a portion of the input port hole of the ceramic waveguide filter 120 in the BPF port-receiving part 145 is disposed as an input port location **131*a* and a location that is extended in a predetermined pattern shape from the input port location 131*a* and that is not related to a portion of the output port hole of the ceramic waveguide filter 120 is disposed as an output port location 131*b***.

The input port of the ceramic waveguide filter, that is, the BPF 120, and the input port location **131*a* of the microstrip line filter, that is, the LPF 130, are disposed at the same BPF port-receiving part 145. Although not illustrated, a power feed signal may be received through the input port of the ceramic waveguide filter and the input port location of the microstrip line filter without a short with the input port location 131*a* of the microstrip line filter, that is, the LPF 130, through the medium of an input port terminal of the main board 110. In this case, a short with the outside can be prevented by one of the input and output port support parts 143**.

Meanwhile, an LPF circuit-receiving part 149 for receiving the predetermined pattern shape of the microstrip line filter, that is, the LPF 130, may be incised and formed in the separation part bodies 141 and 142 of the air layer-forming pad 140. More specifically, an input point portion of a power feed signal, among the components of the microstrip line filter, that is, the LPF 130, may be provided in a form in which the LPF circuit-receiving part 149 is shared with the BPF port-receiving parts 145. The LPF circuit-receiving part 149 may be incised and formed in a way to be extended from the input port location **131*a* of the microstrip line filter, that is, the LPF 130**, to an output port point thereof, that is, an output point.

Moreover, a signal line incision part 150 that is incised and formed from the BPF port-receiving parts 145 formed at a location corresponding to the output port hole, among the components of the ceramic waveguide filter that is the BPF 120, to the end of the support plate part 141 may be further formed in the separation part bodies 141 and 142 of the air layer-forming pad 140. A signal line that is related to an output signal path may be received and disposed within the signal line incision part 150.

More specifically, as referenced in FIG. 7, the microstrip line filter 130 that is provided as the LPF may include a pattern-forming part 133 that is provided as a conductive material and that connects the input port location **131*a*, the output port location 131*b***, and both without a disconnection.

A part of the pattern-forming part 133 may serve as a transmission line for transmitting a signal from the input port location **131*a* to the output port location 131*b*. A part of the pattern-forming part 133 may be formed in a shape in which capacitor lines 135*a* and 135*b* serving as capacitance and an inductor line 135*c*** serving as an inductor are repeated.

That is, a one-side capacitor line **135*a* serving as a capacitor, the other-side capacitor line 135*b* arranged in parallel to the one-side capacitor line 135*a* in a way to be separated from the one-side capacitor line 135*a*, and the inductor line 135*c* that connects the one-side capacitor line 135*a* and the other-side capacitor line 135*b* may be patternized and formed in the microstrip line filter, that is, the LPF 130, in a way to be repeated in a certain section. In this case, the pattern-forming part 133 of the microstrip line filter, that is, the LPF 130, may be fully received within the LPF circuit-receiving part 149 of the air layer-forming pad 140**.

In this case, the filter board 105 is made of any one of the dielectric material and the ceramic material as described above, and thus may result in the insertion loss of the microstrip line filter, that is, the LPF 130.

In order to prevent such an insertion loss, as referenced in (a) and (b) of FIG. 9, a separation incision part 137 having a hole or groove form, for separating a part of or the entire inductor line **135*c* from the front surface of the filter board 105 may be formed in the filter board 105. Accordingly, overall performance of a filter product can be improved because the insertion loss of the microstrip line filter 130 attributable to the material of the filter board 105** can be minimized.

Figure 10:
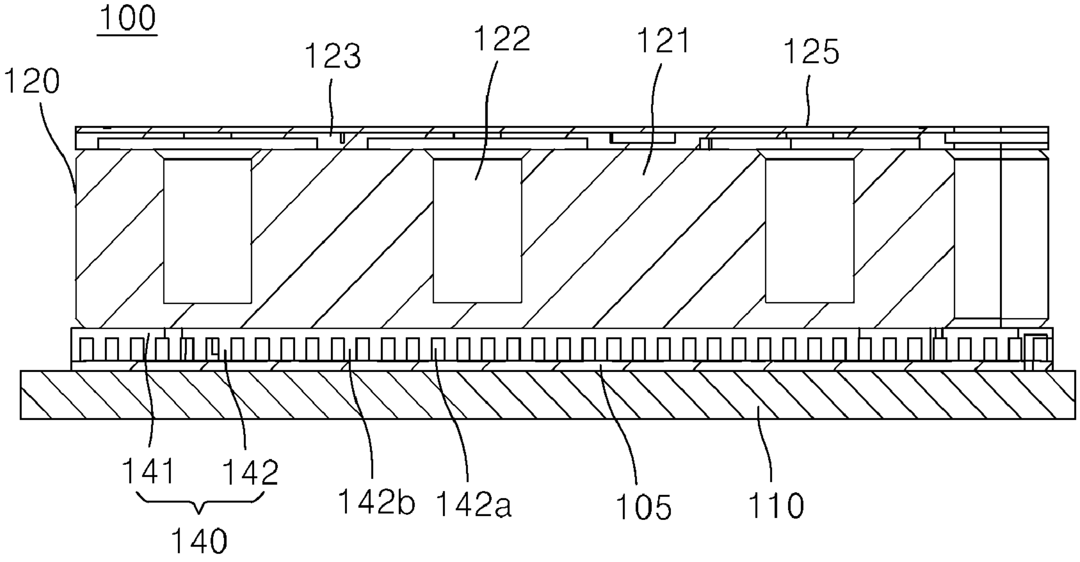
FIG. 10 is a cross-sectional view taken along line B-B in FIG. 2A.

FIG. 10 is a cross-sectional view taken along line B-B in FIG. 2A.

As referenced in FIG. 10, in the RF filter assembly 100 for an antenna according to an embodiment of the present disclosure, the filter board 105 may be stacked on the front surface of the main board 110, and the multiple RF filters 100 may be mounted on the front surface of the filter board 105.

In this case, the microstrip line filter, that is, a kind of LPF 130, among the multiple RF filters 100, may be integrally printed and formed on the front surface of the filter board 105. The multiple ceramic waveguide filters, that is, a kind of BPFs 120, among the multiple RF filters 100, may be stacked and disposed in a way to be separated from the front surface of the filter board 105 at a predetermined distance through the medium of the air layer-forming pad 140.

As described above, the microstrip line filter, that is, the LPF 130 that has been integrally formed on the front surface of the filter board 105, and the rear surface of the ceramic waveguide filter, that is, the BPF 120, are mutually separated from each other by the air layer-forming pad 140, so that the predetermined air layer is formed. The minimization of the insertion loss can be implemented.

Figure 11:
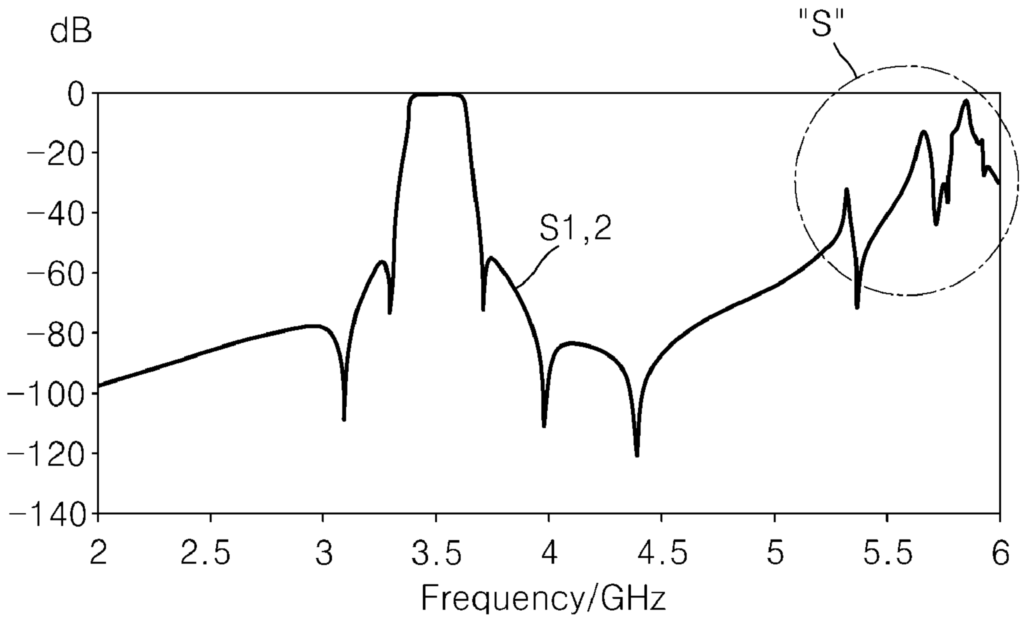
FIG. 11 is a plot chart illustrating RF characteristics of a bandpass filter (BPF), among the components of the RF filter assembly for an antenna according to an embodiment of the present disclosure.
Figure 12:
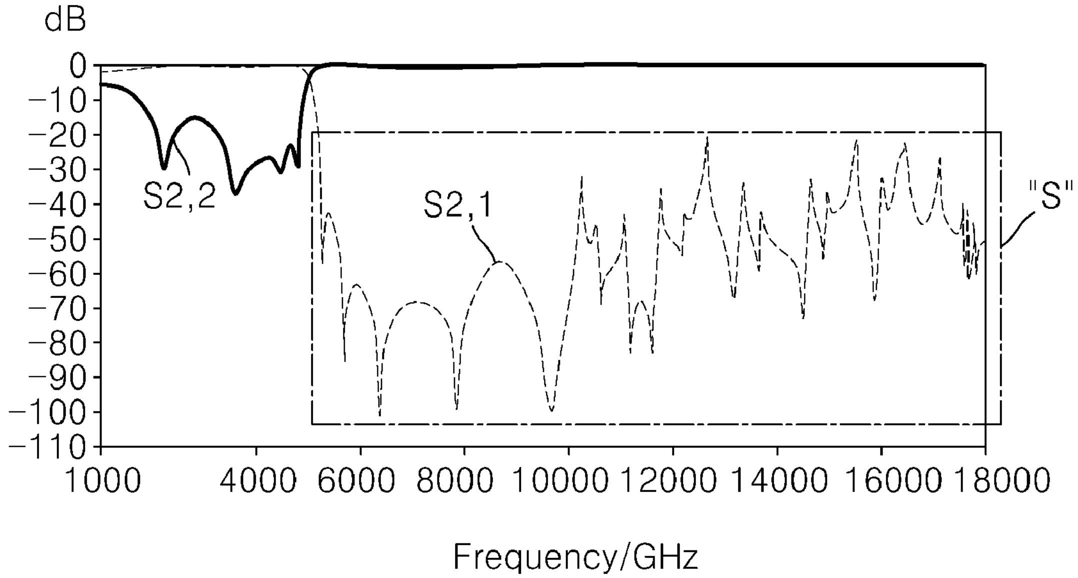
FIG. 12 is a plot chart illustrating RF characteristics of a low pass filter (LPF) among the components of the RF filter assembly for an antenna according to an embodiment of the present disclosure.
Figure 13:
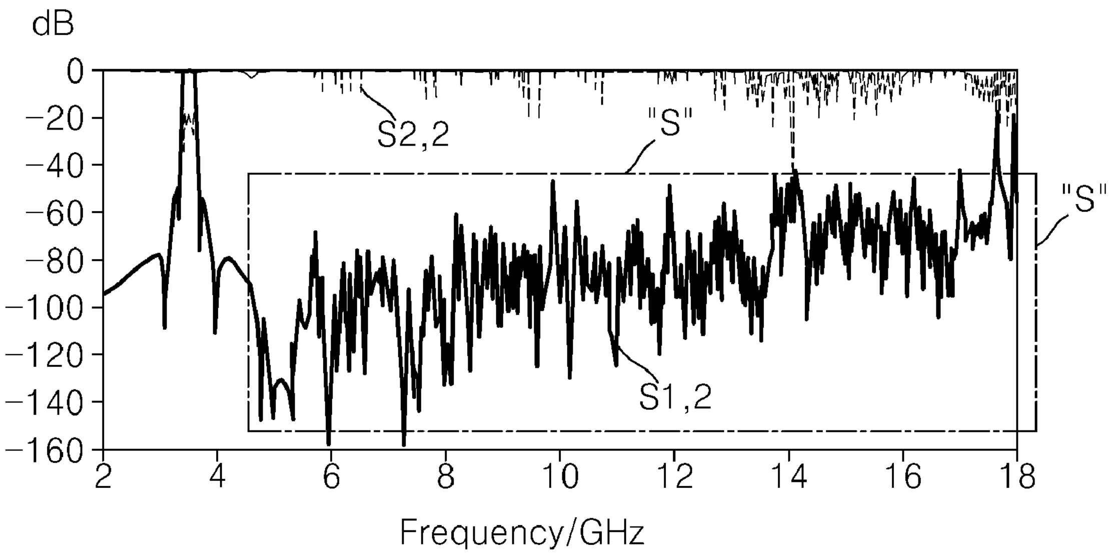
FIG. 13 is a plot chart illustrating RF characteristics of a form in which the results of FIGS. 11 and 12 have been merged.

FIG. 11 is a plot chart illustrating RF characteristics of the ceramic waveguide filter. FIG. 12 is a plot chart illustrating RF characteristics of the microstrip line filter. FIG. 13 is a plot chart illustrating RF characteristics of the state in which the ceramic waveguide filter of FIG. 11 and the microstrip line filter of FIG. 12 are used in combination.

As referenced in FIG. 11, if the ceramic waveguide filter has been adopted as the BPF 120, there is a problem in that spurious S is present on the outside of a frequency pass band in view of characteristics of the ceramic material. In order to remove such spurious S of the BPF 120, the LPF 130 having the RF characteristics that have been referenced in FIG. 12 is adopted.

That is, as referenced in FIG. 12, spurious S occurs around 5.3 GHz on the outside of the pass band. If a low pass of the microstrip line filter, that is, the LPF 130, is designed to become approximately around 5.3 GHz, that is, a point at which the spurious S first occurs, as referenced in FIG. 13, a low pass design in a frequency band, other than a pass band required by a designer, is performed as referenced in FIG. 13.

In particular, the RF filter assembly 100 for an antenna according to an embodiment of the present disclosure has an advantage in that a pass band frequency having a frequency band required by a designer can be easily designed because the insertion loss of the microstrip line filter, that is, the LPF 130, can be minimized by the air layer-forming pad 140.

The RF filter assembly for an antenna according to an embodiment of the present disclosure has been described in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the RF filter assembly for an antenna, which minimizes an insertion loss and has improved assembly and productivity.

The invention claimed is:

1. An RF filter assembly for an antenna, comprising:

a bandpass filter (BPF);

a filter board stacked and disposed on a front surface of a main board and configured to mediate a coupling of the BPF with the front surface of the main board;

a low pass filter (LPF) in which a capacitor line serving as capacitance and an inductor line serving as an inductor are printed on a front surface of the filter board in an intaglio or embossed form; and an air layer-forming pad disposed between the filter board and the BPF and configured to form a predetermined air layer between the front surface of the filter board and a rear surface of the BPF.

2. The RF filter assembly of claim 1, wherein the BPF comprises a ceramic waveguide filter made of a ceramic material.

3. The RF filter assembly of claim 1, wherein the filter board comprises any one of a dielectric material and an FR4 material.

4. The RF filter assembly of claim 1, wherein the air layer-forming pad is made of a metal material or a dielectric.

5. The RF filter assembly of claim 1, wherein the LPF comprises a microstrip line filter provided as a conductive material and integrally formed on the front surface of the filter board in a way to be exposed to the front surface.

6. The RF filter assembly of claim 5, wherein:

the microstrip line filter is printed and formed on the front surface of the filter board in a predetermined pattern shape from an input point of a power feed signal to an output point thereof, and an LPF circuit-receiving part for receiving the predetermined pattern shape of the microstrip line filter is incised and formed in the air layer-forming pad.

7. The RF filter assembly of claim 5, wherein:

input and output ports for inputting and outputting power feed signals are connected to the rear surface of the BPF in a way to be separated from each other, and BPF port-receiving parts for receiving locations corresponding to the input and output ports of the BPF, respectively, are incised and formed in the air layer-forming pad.

8. The RF filter assembly of claim 5, wherein:

a one-side capacitor line serving as the capacitance, another side capacitor line arranged in parallel to the one-side capacitor line in a way to be separated from the one-side capacitor line, and the inductor line connecting the one-side capacitor line and the another side capacitor line are repeatedly formed in a certain section in the microstrip line filter, and a part of or the entire inductor line is separated from the front surface of the filter board.

9. The RF filter assembly of claim 8, wherein a separation incision part having a hole or groove form and separating the part of or the entire inductor line is formed in the filter board.

10. The RF filter assembly of claim 1, wherein the RF filter assembly comprises multiple BPFs including the BPF, and wherein the air layer-forming pad comprises:

an separation part body configured to separate the BPFs from the front surface of the filter board at a predetermined distance; and input and output port support parts provided within the separation part body in a way to be separated from the separation part body and configured to separate, from the filter board, each of portions corresponding to the input and output ports that are provided to be responsible for an input and output of power feed signals to and from the BPF.

11. The RF filter assembly of claim 10, wherein the separation part body and the input and output port support parts separate the multiple BPFs from each other at an identical height.

12. The RF filter assembly of claim 10, wherein the separation part body comprises:

a support plate part surface into contact with the rear surface of the BPF; and an edge support stage bent from an end of an edge of the support plate part toward the front surface of the filter board.

13. The RF filter assembly of claim 12, wherein the edge support stage is formed in a shape in which a concave part and a convex part are repeated along the end of the edge.

* * * * *